(12) United States Patent
Reddy et al.

(10) Patent No.: US 8,929,106 B2
(45) Date of Patent: Jan. 6, 2015

(54) MONOTONIC PRE-BIAS START-UP OF A DC-DC CONVERTER

(75) Inventors: Raghothama Reddy, Murphy, TX (US); Stephen Guthrie, Allen, TX (US); Subarna Pal, Wylie, TX (US)

(73) Assignee: General Electric Company, Schenectady, NY (US)

( * ) Notice: Subject to any disclaimer, the term of this patent is extended or adjusted under 35 U.S.C. 154(b) by 25 days.

(21) Appl. No.: 13/474,578

(22) Filed: May 17, 2012

(65) Prior Publication Data

US 2012/0294052 A1 Nov. 22, 2012

Related U.S. Application Data

(60) Provisional application No. 61/488,453, filed on May 20, 2011.

(51) Int. Cl.
*H02M 1/36* (2007.01)
*H02M 3/335* (2006.01)

(52) U.S. Cl.
CPC ............ *H02M 1/36* (2013.01); *H02M 3/33515* (2013.01)
USPC .......................................................... 363/49

(58) Field of Classification Search
USPC .............................. 323/238, 321, 901; 363/49
See application file for complete search history.

(56) References Cited

U.S. PATENT DOCUMENTS

| 6,166,934 | A | 12/2000 | Kajouke et al. |
| 6,414,860 | B1 | 7/2002 | Li |
| 6,456,511 | B1* | 9/2002 | Wong .......................... 363/21.13 |
| 7,667,989 | B2* | 2/2010 | Liu ................................. 363/49 |
| 7,723,970 | B1 | 5/2010 | Fernald |
| 7,843,178 | B1* | 11/2010 | Houk et al. .................... 323/901 |
| 2003/0026115 | A1 | 2/2003 | Miyazaki |
| 2004/0008528 | A1* | 1/2004 | Umemoto et al. ............... 363/49 |
| 2004/0130919 | A1* | 7/2004 | Sullivan et al. ................. 363/49 |

(Continued)

FOREIGN PATENT DOCUMENTS

| CN | 1578090 A | 2/2005 |
| CN | 101860186 A | 10/2010 |
| CN | 102075086 A | 5/2011 |
| WO | 0182460 A1 | 11/2001 |

OTHER PUBLICATIONS

Non-Final Office Action, U.S. Appl. No. 13/491,673 mailed Aug. 19, 2013, 21 pages.

(Continued)

*Primary Examiner* — Gary L Laxton
*Assistant Examiner* — Alex Torres-Rivera
(74) *Attorney, Agent, or Firm* — General Electric Company

(57) ABSTRACT

The power conversion module includes a power converter coupled to provide a DC output voltage from an input voltage source. The power converter may have primary and secondary stages, and the power converter may also provide a DC output voltage that is electrically isolated from the input voltage source. Additionally, the power conversion module also includes a voltage controller configured to measure a pre-bias value of the output voltage prior to start-up of the power converter and provide a start-up control signal, wherein the start-up control signal corresponds to an initial output voltage that is greater than the pre-bias value of the output voltage. The initial output voltage includes a start-up voltage margin above the pre-bias value and is maintained for a margin hold time. A method of operating a power conversion module is also provided.

25 Claims, 5 Drawing Sheets

(56) References Cited

U.S. PATENT DOCUMENTS

| | | |
|---|---|---|
| 2007/0008752 A1 | 1/2007 | Senouci |
| 2008/0074158 A1 | 3/2008 | Ryu et al. |
| 2009/0108819 A1 | 4/2009 | Liu |
| 2009/0121697 A1* | 5/2009 | Aiura et al. ............... 323/285 |
| 2011/0109294 A1 | 5/2011 | Larson |
| 2011/0179292 A1* | 7/2011 | Clegg et al. ............... 323/901 |

OTHER PUBLICATIONS

Notice of Allowance and Notice of Allowability, U.S. Appl. No. 13/491,673 mailed Apr. 14, 2014, 8 pages.

* cited by examiner

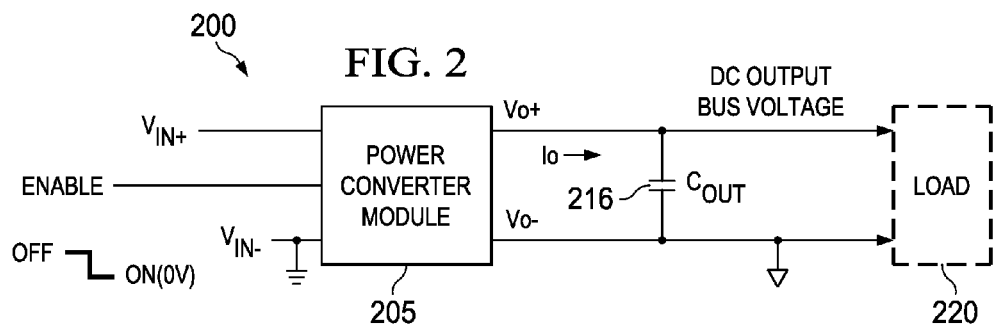
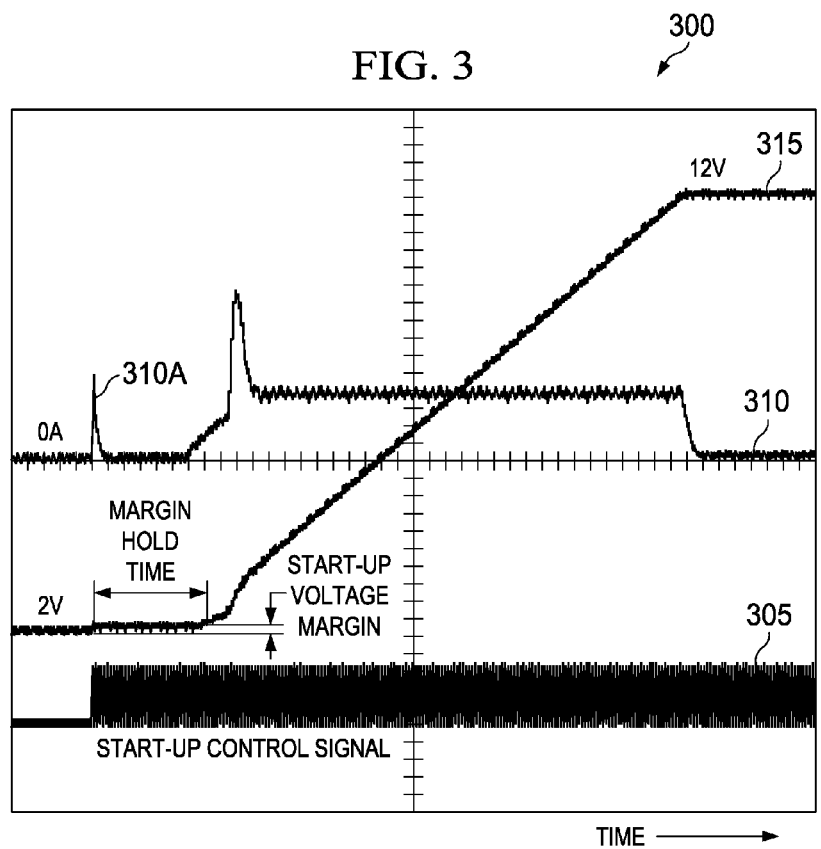

MONOTONIC PRE-BIAS START-UP OF A DC-DC CONVERTER

CROSS-REFERENCE TO RELATED APPLICATION

This application claims the benefit of U.S. Provisional Application Ser. No. 61/488,453, filed by Raghothama Reddy, Stephen Guthrie and Subarna Pal on May 20, 2011 entitled "Monotonic Pre-bias Start-up of a DC-DC Converter," commonly assigned with this application and incorporated herein by reference.

TECHNICAL FIELD

This application is directed, in general, to power conversion and, more specifically, to a power conversion module and a method of operating a power conversion module.

BACKGROUND

Synchronous rectification has become a preferred approach of achieving higher efficiency switching power supplies, especially in step-down industrial applications. Additionally, a present requirement dictates that power supplies be capable of starting into a pre-bias load condition where the initial load voltage has a value that is non-zero. This may be generally referred to as a power converter having the capability to monotonically start-up into pre-biased loads. Synchronous rectifiers are capable of conducting output current in both directions thereby allowing sinking and sourcing of the output current. If not controlled, the reverse (sinking) current flow can interfere with normal start-up of a DC-DC converter or even cause damage to the unit. Improvements to prevent sinking of an output current, especially during converter start-up, would prove beneficial to the art.

SUMMARY

Embodiments of the present disclosure provide a power conversion module and a method of operating a power conversion module.

In one embodiment, the power conversion module includes a power converter coupled to provide a DC output voltage from an input voltage source. The power converter may have primary and secondary stages, and the power converter may also provide a DC output voltage that is electrically isolated from the input voltage source. Additionally, the power conversion module also includes a voltage controller configured to measure a pre-bias value of the output voltage prior to start-up of the power converter and provide a start-up control signal, wherein the start-up control signal corresponds to an initial output voltage that is greater than the pre-bias value of the output voltage. The initial output voltage includes a start-up voltage margin above the pre-bias value and is maintained for a margin hold time.

In another aspect, the method of operating a power conversion module includes measuring a pre-bias value of an output voltage prior to start-up of a power converter. The power converter may also be electrically isolated. The method also includes calculating a start-up control signal, wherein the start-up control signal corresponds to an initial output voltage that is greater than the pre-bias value of the output voltage and applying the initial output voltage having a start-up voltage margin for a margin hold time at start-up of the power converter.

The foregoing has outlined preferred and alternative features of the present disclosure so that those skilled in the art may better understand the detailed description of the disclosure that follows. Additional features of the disclosure will be described hereinafter that form the subject of the claims of the disclosure. Those skilled in the art will appreciate that they can readily use the disclosed conception and specific embodiment as a basis for designing or modifying other structures for carrying out the same purposes of the present disclosure.

BRIEF DESCRIPTION

Reference is now made to the following descriptions taken in conjunction with the accompanying drawings, in which:

FIG. 2 illustrates a block diagram of a power converter system having a capacitor connected to an output bus and configured to supply an output voltage to a load;

FIG. 3 illustrates a collection of waveforms showing a converter start-up scenario for the power converter module of FIG. 2;

Figure 6:
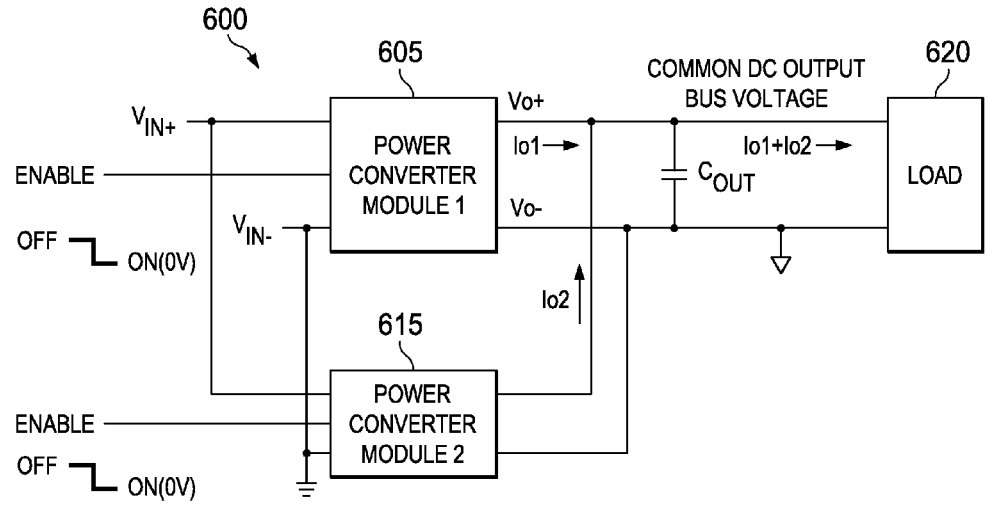
FIG. 6 illustrates a block diagram of a power converter system employing two power converter modules having the same output voltages applied to a common load.
Figure 8:
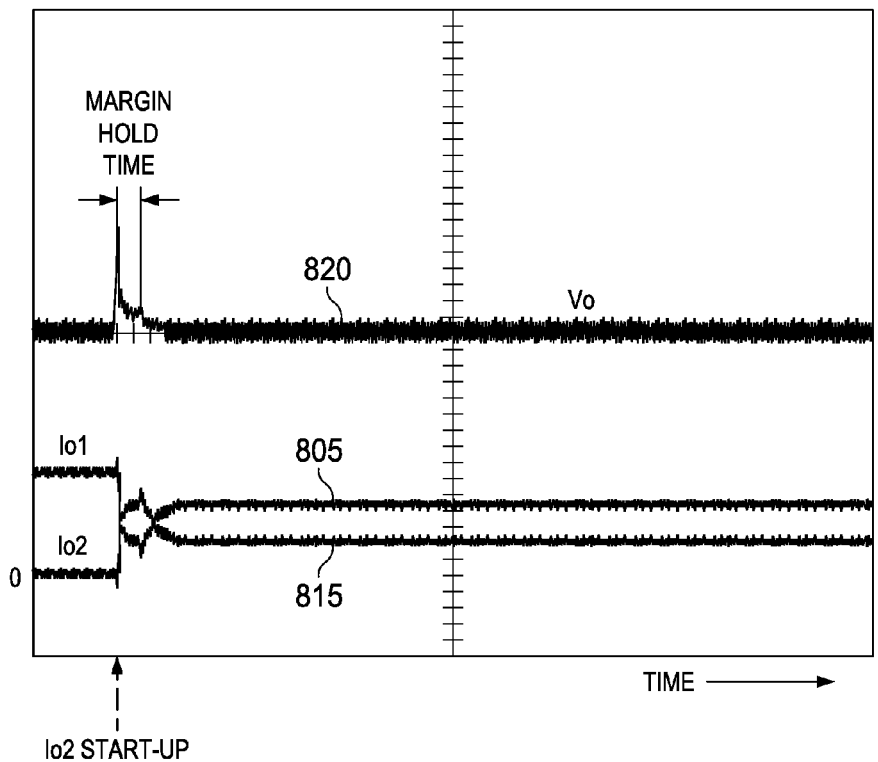
Figure 9:
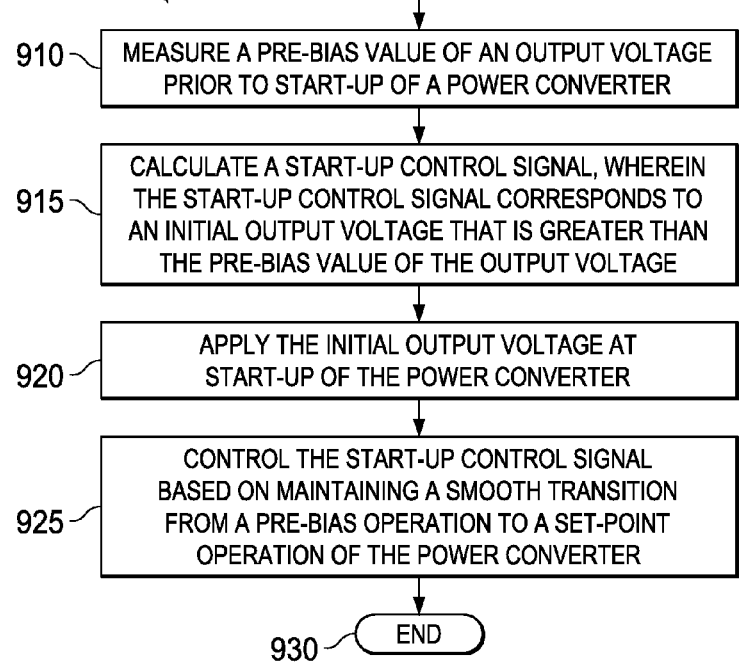

FIG. 8 illustrates still another collection of waveforms showing a converter start-up scenario for the second power converter module of FIG. 6 with power converter modules having a regulated output voltage and no output voltage droop; and FIG. 9 illustrates a flow diagram of an embodiment of a method of operating a power conversion module carried out according to the principles of the present disclosure.

DETAILED DESCRIPTION

The DC-DC converter embodiments described in this disclosure employ a control architecture utilizing digital signal processing with access to the output voltage. Various types of microprocessor devices (e.g., a Digital Signal Processor (DSP)) may be employed. Before turn-on of the power stage is initiated, a secondary control circuit detects and measures a pre-bias output voltage. There are two types of pre-bias conditions that may be encountered. The first is where a pre-bias output voltage may be provided by an output capacitor discharging or in the case of two converters with different output voltages connected by a blocking diode (shown in FIG. 4). In these cases, there is no requirement to current share but simply to prevent reverse current flow. The second case is where a plurality of power converters with the same output voltage are connected to a common bus without an ORing diode or other circuitry which prevents reverse current flow. This case requires both a pre-bias start-up with no reverse current flow and eventual current sharing.

Knowing the pre-bias voltage on the output along with an input source voltage, a power controller can calculate a startup control signal that provides an output voltage equal to the measured pre-bias voltage plus a small margin. Along with the DC output voltage and input source voltage, other factors such as temperature, current, efficiency and device characteristics may be used in the start-up control signal calculation to produce a more accurate result. This calculation occurs prior to enabling operation of the DC-DC converter.

Figure 1:
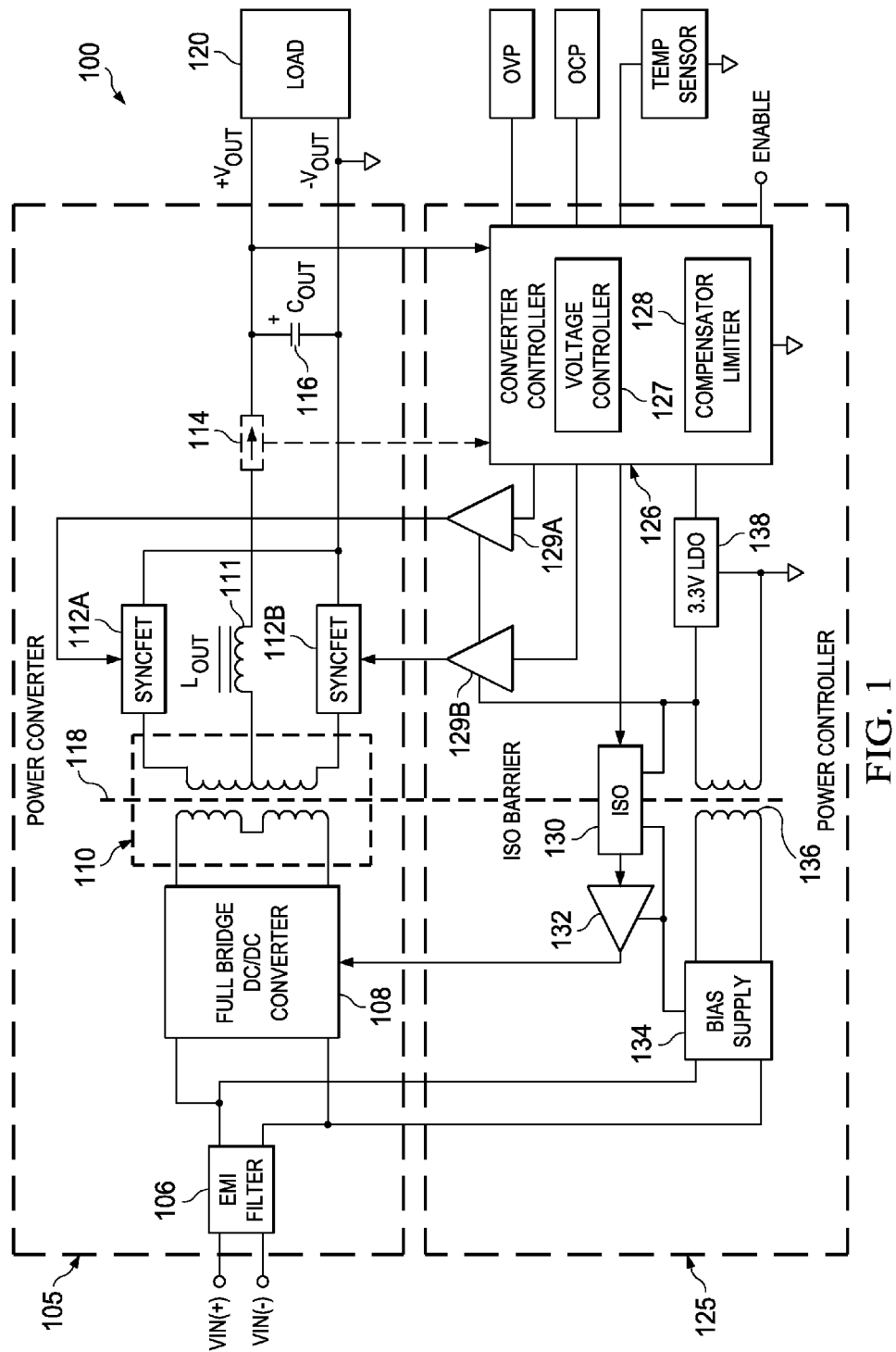
FIG. 1 illustrates a block diagram of a power conversion module, which employs a secondary control architecture constructed according to the principles of the present disclosure.

FIG. 1 illustrates a block diagram of a power conversion module, generally designated 100, which employs a secondary control architecture constructed according to the principles of the present disclosure. The power conversion module 100 includes a power converter 105 and a power controller 125. The power converter 105 has primary and secondary stages that are electrically isolated from each other across an isolation barrier 118 and provide separate primary and secondary grounding structures. The power controller 125 also employs the isolation barrier 118 to electrically isolate primary and secondary stage components referenced to the separate grounding structures.

The power converter 105 is connected to convert an input voltage Vin to a DC output voltage Vout across a load 120. The power converter 105 includes an electromagnetic interference (EMI) filter 106, a full bridge DC-DC converter 108, a main power transformer 110 and an output inductor 111, first and second synchronous output switches (e.g., FETs) 112A, 112B, an optional output current sensing unit 114 and an output filter capacitor (Cout) 116. The output filter capacitor (Cout) 116 may be comprised of an output filter capacitor contained within the power converter 105 and a filter capacitor that is external to the power converter connected from +Vout to −Vout. The main power transformer 110 forms part of the isolation barrier 118. In addition, the power transformer 110 and output inductor 111 may be combined into an integrated magnetic structure.

The power controller 125 includes a converter controller 126 having a voltage controller 127 and a compensator limiter 128. The power controller 125 also includes first and second secondary switch drivers 129A, 129B, an optical isolator 130, a primary switch driver 132 and a bias supply unit 134 that is connected through a bias supply transformer 136 to a DC bias voltage unit 138. The optical isolator 130 and the bias supply transformer 136 also form part of the isolation barrier 118.

During operation, the EMI filter 106 provides input voltage EMI filtering for the power converter 105. In the present embodiment, the full bridge DC-DC converter 108 provides a full wave signal to primary windings of the main power transformer 110. The secondary windings of the main power transformer then provide a full wave secondary signal to the first and second synchronous output switches 112A, 112B for rectification. A rectified output signal is provided from a secondary winding center tap of the main power transformer to an output filter containing the output inductor 111 and the output filter capacitor 116. The optional output current sensing unit 114 provides an indication of an output current magnitude for the power converter 105.

The power controller 125 provides operating control of the power converter 105 allowing it to deliver output voltage and output current to the load 120, based on established set points and feed back information from the converter output. Generally, the voltage controller 127 establishes control signals (e.g., pulse width modulation (PWM) signals) that are provided through the primary and first and second secondary switch drivers 132, 129A and 129B to control conduction times of the primary and secondary stages. The optical isolator 130 provides electrical isolation for primary control signals, as noted above. The bias supply unit 134, bias supply transformer 136 and DC bias voltage unit 138 provide required secondary supply power that is independent of the operating status of the power converter 105.

In a pre start-up situation, the converter controller 126 guides the power conversion module 100 through a start-up sequence that ensures proper conversion system turn-on conditions are met. These turn-on conditions include determining that there are no general fault conditions present (e.g., over-temperature or improper input voltage conditions) and that a TRUE enable command is present. The output voltage is measured to determine if a pre-bias value of the output voltage is present. If no pre-bias output voltage is present, a safe-start control signal is provided and held to check for output faults. If no output faults are determined, a soft start is performed until a normal run mode is established where converter controller 126 provides control of the power converter module 100 under normal output voltage and current load conditions.

For a pre-bias condition of the output voltage, the voltage controller 127 measures the pre-bias value of the output voltage prior to start-up of the power converter 105 and provides a start-up control signal corresponding to an initial output voltage from the power converter 105 that is greater than the measured pre-bias voltage value by a start-up voltage margin. Additionally, the compensator limiter 128 limits variation of the start-up control signal after the margin hold time to provide a smooth transition from pre-bias start-up operation to set point operation while maintaining a sourcing output current condition for the power converter 105 during the entire start-up sequence.

Generally, this start-up control signal (e.g., an initial PWM duty cycle control signal) from the voltage controller 127 provides an initial converter output voltage having a start-up voltage margin that may be only slightly greater than the pre-bias voltage value. For example, for a pre-bias voltage of about 12 Vdc, the start-up voltage margin may be about 100 millivolts.

The magnitude of the start-up voltage margin may vary depending on a ratio of the measured pre-bias voltage to the set point output voltage of the power converter 105. For lower values of this ratio, the start-up voltage margin may be greater than for higher ratio values. Although greater start-up voltage margins provide greater assurance against sinking an output current into the power converter, they may provide higher initial sourcing current values, as well. Therefore, improper selection of the start-up voltage margin may trigger an over current protection cycle and therefore, needs to be avoided.

Since special purpose computing capability (e.g., a microcontroller) may be employed for the converter controller 126, a database (e.g., a table look-up capability) may provide correlating ratios of possible pre-bias voltages to set point output voltages and preferred start-up voltage margins. The voltage controller 127 may then determine an appropriate start-up voltage margin based on expected output conditions for the power converter 105.

This initial (or corrected) PWM duty cycle is maintained (clamped) for a selected period of time (the margin hold time) thereby assuring that current does not flow into the output of the power converter 105 at startup. At the end of the margin hold time, the fixed duty cycle is released. When the fixed duty cycle is released at the end of the margin hold time the compensator limiter 128 provides upper and lower limits to the voltage controller 128 start-up control signal. The upper limit provides control of the maximum allowable duty cycle and the lower limit controls the minimum allowable duty cycle. Therefore, the output voltage is controlled with a range determined by the upper and lower limits provided by the compensator limiter 128. The upper and lower limits may be initially set equal to each other at a value to maintain the PWM duty cycle at the initial or clamped value. The compensator limiter 128 then causes the upper and lower limits to the start-up control signal to diverge in value at a specified rate of change. The rate of change at which the limits diverge is slow (e.g., about 10 percent of maximum capability) compared to the rate of change capability of the start-up control signal.

Eventually the upper and lower limits of the compensator limiter 128 equal that of the voltage controller 127 during normal operation and the start sequence is complete where normal (set point) operation occurs. The rate at which the compensator limits change may be fixed or adaptive. The adaptive rate of change may, for example, be a function of the pre-bias voltage compared to the output voltage set point. For example, a pre-bias voltage that is less than 20 percent of the output voltage set point may have faster rate of change than a pre-bias voltage that is greater than 80 percent of the output voltage set point. Without the compensator limiter function, the output voltage may have unwanted excursions and transitions after the duty cycle clamp is released at the start of the margin hold time.

The output voltage set point may also include output voltage droop in the calculation, if voltage droop is a provided feature and enabled. Output voltage droop is a feature by which the output voltage regulation set-point is reduced as a function of the output current. For example, the output voltage set-point at no load may be 12.0 Vdc and be reduced to 11.5 Vdc at full load. If the pre-bias value of the output voltage is below the lower limit of the voltage droop range, a soft start sequence is initiated to bring the module to the desired output voltage set point.

If within the output voltage droop range, upper and lower compensator limiter clamp limits are initialized to correspond to an original calculated output voltage pre-bias value, which includes the droop value. Additionally, a voltage droop target value is calculated based upon the output current and a voltage droop factor (often expressed in millivolts per ampere (mv/A)). In order to control the rate at which the output current reaches its final current sharing value without sinking current from a common DC bus, for example, either the upper clamping limits or both upper and lower clamping limits associated with the compensator limiter 128 are slowly adjusted such that the output voltage is always higher than the previously computed value.

The rate of voltage droop adjustment to the output voltage set point is limited until a voltage droop adjustment value equals the voltage droop target voltage. When the upper and lower limits of the compensator limiter 128 reach the normal operating limits of the voltage controller 127 control signal, the compensation process is complete and rate limit can be re-initialized to its normal levels. Rate limiting on the voltage droop adjustment may be always active with the goal of producing smooth current transitions without overshoot as the load varies under typical operating conditions. The rate of change with output voltage droop may be different than that used if output voltage droop is not enabled.

FIG. 2 illustrates a block diagram of a power converter system, generally designated 200, having a capacitor connected to an output bus and configured to supply an output voltage to a load. The power converter system 200 includes an input voltage $V_{IN}$ for a power converter module 205 that provides the output voltage. The power converter module 205 employs an output filter capacitor (Cout) 216 and is connectable to a load 220.

FIG. 3 illustrates a collection of waveforms, generally designated 300, showing a converter start-up scenario for the power converter module 205 of FIG. 2. The converter start-up scenario illustrates a converter start-up with a pre-bias voltage value of about 2 Vdc on the output filter capacitor (Cout) 216 for an otherwise no load condition. The waveforms 200 include a start-up control signal 305, a converter output current 310 and a converter output voltage 315 starting at the pre-bias voltage value of about 2 Vdc and increasing to an output voltage of 12 Vdc.

At the beginning of the start-up control signal 305, the start-up voltage margin is applied to the pre-bias voltage of about 2 Vdc and held for a period of time (margin hold time), as shown. A converter sourcing output current spike 310A occurs at this time due to an initial adjustment charging of the output filter capacitor 216 based on the applying the start-up voltage margin. The output current 310 then returns to zero during the margin hold time of the start-up voltage margin.

At the end of the margin hold time, a soft start is performed until a normal run mode is established and the output voltage 315 increases to 12 Vdc, which is its set point value. The converter output current 310 transitions to a constant sourcing value during this time thereby charging the output filter capacitor 216 to its 12 Vdc value, before returning to zero. During this operation, the converter output current remains sourcing from the power converter 205 (i.e., the power converter 205 never sinks output current).

Figure 4:
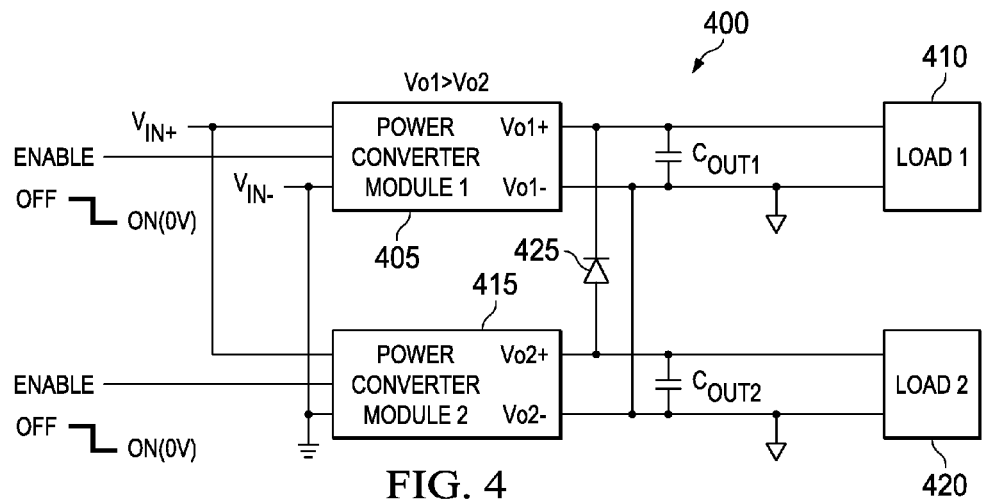
FIG. 4 illustrates a block diagram of a power converter system employing two power converter modules having different output voltages applied to different loads.

FIG. 4 illustrates a block diagram of a power converter system, generally designated 400, employing two power converter modules having different output voltages applied to different loads. The power converter system 400 includes a common input voltage $V_{IN}$, first and second power converter modules 405, 415 having first and second output filter capacitors $C_{OUT1}$, $C_{OUT2}$ across first and second converter loads 410, 420 and a diode 425 connected between first and second converter outputs, as shown. In the illustrated embodiment, a first set point output voltage Vo1 is greater than a second set point output voltage Vo2. Additionally, the second power converter module 415 is fully powered up before the first power converter module 405 initiates start-up thereby making the second output voltage Vo2 (minus a voltage drop across the diode 425) a pre-bias voltage for the first power converter module 405. Although FIG. 4 and the subsequent figures and description that refer to FIG. 4 only have two power converter modules shown, it is understood that there can be a greater plurality of power converter modules connected in parallel.

Figure 5:
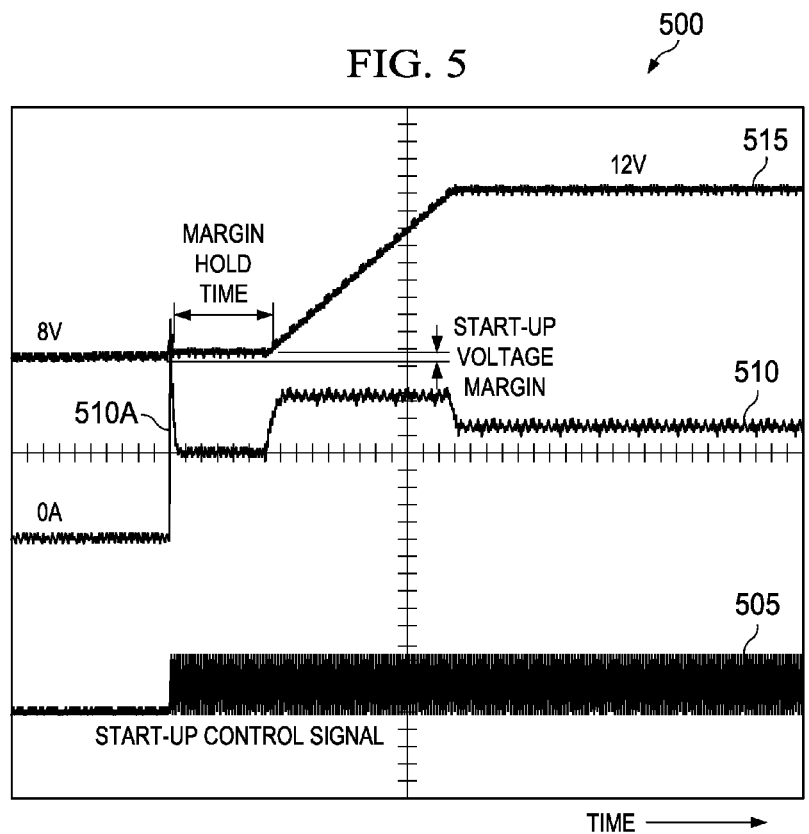
FIG. 5 illustrates another collection of waveforms showing a converter start-up scenario for the first power converter module of FIG. 4.

FIG. 5 illustrates another collection of waveforms, generally designated 500, showing a converter start-up scenario for the first power converter module 405 of FIG. 4. This converter start-up scenario illustrates a converter start-up with a pre-bias voltage value of about 8 Vdc, which is the second output voltage Vo2 minus the voltage drop across the diode 425. The waveforms 500 include a start-up control signal 505, a first power converter module output current 510 and a first power converter module output voltage 515 starting at the pre-bias voltage value of about 8 Vdc and increasing to an output voltage of 12 Vdc.

At the beginning of the start-up control signal 505, a start-up voltage margin is applied to the pre-bias voltage of about 8 Vdc and held for a margin hold time, as shown. Again a converter sourcing output current spike 510A occurs at this time due to an initial adjustment charging of the first output filter capacitor Cout1 based on applying the start-up voltage margin. The output current 510 then returns to a first converter load current during the margin hold time of the start-up voltage margin. At the end of the margin hold time, a soft start is again performed until a normal run mode is established and the first converter output voltage 515 increases to 12 Vdc, which is its set point value.

The first converter output current 510 transitions to a constant sourcing value during this time thereby charging the first output filter capacitor Cout1 to 12 Vdc. At this point, the first converter output current 510 transitions to an output current value required by the first converter load 410. Again, during this operation, the converter output current 510 remains sourcing from the power converter module 405 and never sinks current into the power converter module 405.

FIG. 6 illustrates a block diagram of a power converter system, generally designated 600, employing two power converter modules having the same nominal output voltages applied to a common load. The power converter system 600 includes a common input voltage $V_{IN}$, first and second power converter modules 605, 615 connected to a common output filter capacitor Cout and common load 620. In this example, the first power converter module 605 is fully powered up first supplying a first converter output current Io1 to the common load 620 to provide a required set point output voltage Vo. The output voltage Vo then becomes the pre-bias voltage for the second power converter module 615 at start-up. Although FIG. 6 and the subsequent figures and description that refer to FIG. 6 only have two converters shown, it is understood that there can be a greater plurality of converters connected in parallel.

Figure 7:
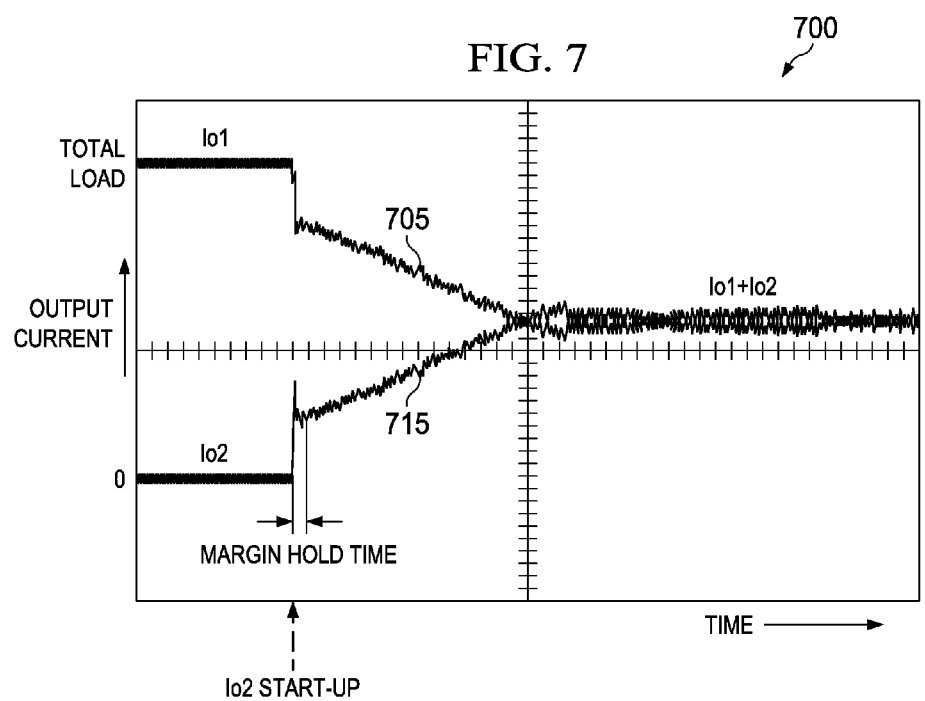
FIG. 7 illustrates yet another collection of waveforms showing a converter start-up scenario for the second power converter module of FIG. 6 for power converter modules having an output voltage droop feature.

FIG. 7 illustrates yet another collection of waveforms, generally designated 700, showing a converter start-up scenario for the second power converter module 615 of FIG. 6. Both power modules in this example have an output voltage droop feature. The waveforms 700 include a first power converter module output current (Io1 output current) 705 and a second power converter module output current (Io2 output current) 715. Before start-up of the second power converter module 615, the output current Io1 from the first power converter module 605 was supplying the total load current for the load 620 corresponding to a converter output voltage Vo.

The waveforms of FIG. 7 show the start-up of the second power converter module 615, which provides a start-up voltage margin that takes into account a droop voltage to a pre-bias voltage Vo at start-up that is held for a margin hold time. Note that the margin hold time indicated in the FIG. 7 occurs at Io2 start-up and lasts for less than one tenth of the major time axis gradient. The second power converter 615 picks up a portion of the load current since the pre-bias voltage calculation takes into account the output droop voltage characteristic. At the conclusion of the margin hold time, the Io1 and Io2 output currents 705, 715 transition to current ramps.

The first and second power converter modules 605, 615 adjust their output voltages until they converge on a bus voltage Vo consistent with the output voltage droop characteristic and the upper and lower limits of a compensator limiter to substantially share the load current. This characteristic enables proper power converter module start-up in a system having a plurality of parallel converters where the load current exceeds that of an individual converter, since the converter that is starting up only picks up a portion of the load current.

FIG. 8 illustrates still another collection of waveforms, generally designated 800, showing another converter start-up scenario for the second power converter module 615 of FIG. 6. The power converter modules in this example do not have an output voltage droop feature. The waveforms 800 include a first power converter module output current (Io1 output current) 805, a second power converter module output current (Io2 output current) 815 and an output voltage (Vo) 820. Before start-up of the second power converter module 615, the output current Io1 from the first power converter module 605 was supplying the total load current for the load 620 corresponding to a converter output voltage Vo.

If there are no distribution resistances on the outputs of the power converter modules 605, 615 (i.e., an ideal condition), this start-up action initially would cause replacement of the first output current Io1 by a second output current Io2 during the margin hold time. Since there are distribution resistances, the initial current Io2 replaces a value less than the load current (e.g., approximately two-thirds of the load current) during the margin hold time. The start-up voltage margin indicated on the Vo 820 during the margin hold time is sufficient to prevent reverse current flow into the output of the power converter module 615. The current sharing between the two power converters is less than that achieved with output voltage droop and relies on the accuracy of the output voltage set-point and distribution resistances.

FIG. 9 illustrates a flow diagram of an embodiment of a method of operating a power conversion module, generally designated 900, carried out according to the principles of the present disclosure. The method 900 starts in a step 905, and in a step 910, a pre-bias value of an output voltage is measured prior to start-up of a power converter. Then, a start-up control signal is calculated, wherein the start-up control signal corresponds to an initial output voltage that is greater than the pre-bias value of the output voltage, in a step 915. The pre-bias value of the output voltage may correspond to an output voltage droop characteristic. The initial output voltage is applied at start-up of the power converter, in a step 920.

In one embodiment, calculating the start-up control signal includes the pre-bias value of the output voltage and a start-up voltage margin, wherein a magnitude of the start-up voltage margin is limited by an output current capability of the power converter. Additionally, the initial output voltage is maintained for a period of time (e.g., a margin hold time) after start-up of the power converter.

In another embodiment, calculating the start-up control signal includes employing at least a portion of a digital controller where calculating the start-up control signal may include employing at least a portion of a software program. Additionally, calculating the start-up control signal includes employing a database of applicable start-up voltage margins corresponding to pre-bias values and set-point voltages.

In yet another embodiment, controlling the start-up control signal is based on maintaining a sourcing output current condition for the power converter which may include monitoring an output current of the power converter. Additionally, controlling the start-up control signal may include employing at least a portion of a software program.

Then in a step 925, at the end of the margin hold time, the start-up control signal is controlled to maintain a smooth transition from a pre-bias operation to a set-point operation of the power converter while maintaining a sourcing output current condition for the power converter during the entire start-up sequence. Here, upper and lower limits of the start-up control signal are set to be equal to a PWM duty cycle, for example, at an initial or clamped value. Compensation limiting then causes the upper and lower limits for voltage controlling of the start-up control signal to slowly diverge. The rate of change at which the limits diverge is slow compared to the rate of change capability of the voltage controller control signal. In one example, the rate of change of the divergence of the limits is fixed. In another example, the rate of change of the divergence is adaptive and may be a function of the pre-bias voltage compared to the output voltage or be a function of output voltage droop. The method 900 ends in a step 930 with the start-up sequence complete and the unit operating normally under set-point control.

While the method disclosed herein has been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

Power converter modules converting AC to DC may also employ the concepts described herein. In addition, other topologies besides the full-bridge described may use these concepts. Other topologies may include half-bridge, two-switch forward, LLC, forward, or other topologies that have synchronous rectification on an output and may sink output current from a bus or other power sources. Power converter topologies, such as a buck or boost for example, that do not provide input-to-output isolation and may not have primary and secondary stages may also employ the concepts described herein provided they employ synchronous rectification and can both source and sink output current, Those skilled in the art to which this application relates will appreciate that other and further additions, deletions, substitutions and modifications may be made to the described embodiments.

What is claimed is:

1. A power conversion module, comprising:
a power converter coupled to provide a DC output voltage from an input voltage source; and
a voltage controller configured to measure a pre-bias value of the output voltage prior to start-up of the power converter and provide a start-up control signal, wherein the start-up control signal corresponds to an initial output voltage that is greater than the pre-bias value of the output voltage by a start-up voltage margin, wherein the start-up voltage margin is limited by an output current capability of the power converter.

2. The power conversion module as recited in claim 1 wherein the initial output voltage is maintained for a period of time after start-up of the power converter.

3. The power conversion module as recited in claim 1 wherein the voltage controller is included as at least a portion of a digital controller.

4. The power conversion module as recited in claim 1 wherein the voltage controller has access to a database of applicable start-up voltage margins corresponding to pre-bias values and set-point voltages.

5. The power conversion module as recited in claim 1 wherein at least a portion of the voltage controller is embodied as a software program.

6. The power conversion module as recited in claim 1 further comprising a compensator limiter configured to control the start-up control signal based on maintaining a smooth transition from a pre-bias operation to a set point operation.

7. The power conversion module as recited in claim 1 further comprising a second power converter, wherein as output voltage of the second power converter sets the pre-bias value for the power converter.

8. The power conversion module as recited in claim 6 wherein the compensator limiter is included as at least a portion of a digital controller.

9. The power conversion module as recited in claim 6 wherein at least a portion of the compensator limiter is embodied as a software program.

10. The power conversion module as recited in claim 6 wherein the compensator limiter provides upper and lower limits to the start-up control signal that diverge at a specified rate of change.

11. The compensation limiter as recited in claim 10 wherein the rate of change is adaptive to the pre-bias value of the output voltage.

12. The compensation limiter as recited in claim 10 wherein the rate of change is adaptive to an output voltage droop.

13. A method of operating a power conversion module, comprising:
measuring a pre-bias value of an output voltage prior to start-up of a power converter;
calculating a start-up control signal, wherein the start-up control signal corresponds to an initial output voltage that is greater than the pre-bias value of the output voltage, and wherein calculating the start-up control signal includes employing a database of applicable start-up voltage margins corresponding to pre-bias values and set-point voltages; and
applying the initial output voltage at start-up of the power converter.

14. The method as recited in claim 13 wherein calculating the start-up control signal includes the pre-bias value of the output voltage and a start-up voltage margin.

15. The method as recited in claim 13 wherein the initial output voltage is maintained for a period of time after start-up of the power converter.

16. The method as recited in claim 13 wherein calculating the start-up control signal includes employing at least a portion of a digital controller.

17. The method as recited in claim 13 wherein calculating the start-up control signal includes employing at least a portion of a software program.

18. The method as recited in claim 13 further comprising controlling the start-up control signal based on maintaining a smooth transition from a pre-bias operation to a set point operation.

19. The method as recited in claim 13 further comprising electrically coupling a second power converter to the power converter, wherein as output voltage of the second power converter sets the pre-bias value for the power converter.

20. The method as recited in claim 14 wherein a magnitude of the start-up voltage margin is limited by an output current capability of the power converter.

21. The method as recited in claim 18 wherein controlling the start-up control signal includes monitoring an output current of the power converter.

22. The method as recited in claim 18 wherein controlling the start-up control signal includes employing at least a portion of a software program.

23. The method as recited in claim 18 wherein upper and lower limiting of the start-up control signal diverges at a specified rate of change.

24. The method as recited in claim 23 wherein the rate of change is adaptive to the pre-bias value of the output voltage.

25. The method as recited in claim 23 wherein the rate of change is adaptive to an output voltage droop.

* * * * *

UNITED STATES PATENT AND TRADEMARK OFFICE
CERTIFICATE OF CORRECTION

PATENT NO. : 8,929,106 B2
APPLICATION NO. : 13/474578
DATED : January 6, 2015
INVENTOR(S) : Reddy et al.

It is certified that error appears in the above-identified patent and that said Letters Patent is hereby corrected as shown below:

In the specification,

In Column 4, Line 62, delete "voltage controller" and insert -- compensator limiter --, therefor.

In Column 9, Line 20, delete "current," and insert -- current. --, therefor.

In the claims,

In Column 9, Line 55, in Claim 7, delete "as" and insert -- an --, therefor.

In Column 10, Line 44, in Claim 19, delete "as" and insert -- an --, therefor.

Signed and Sealed this
Twenty-seventh Day of October, 2015

Michelle K. Lee
*Director of the United States Patent and Trademark Office*